No. 652,307.  
J. H. WILLIAMS.  
DEVICE FOR HANDLING HOGS.  
(Application filed Mar. 17, 1899.)
(No Model.)
Patented June 26, 1900.
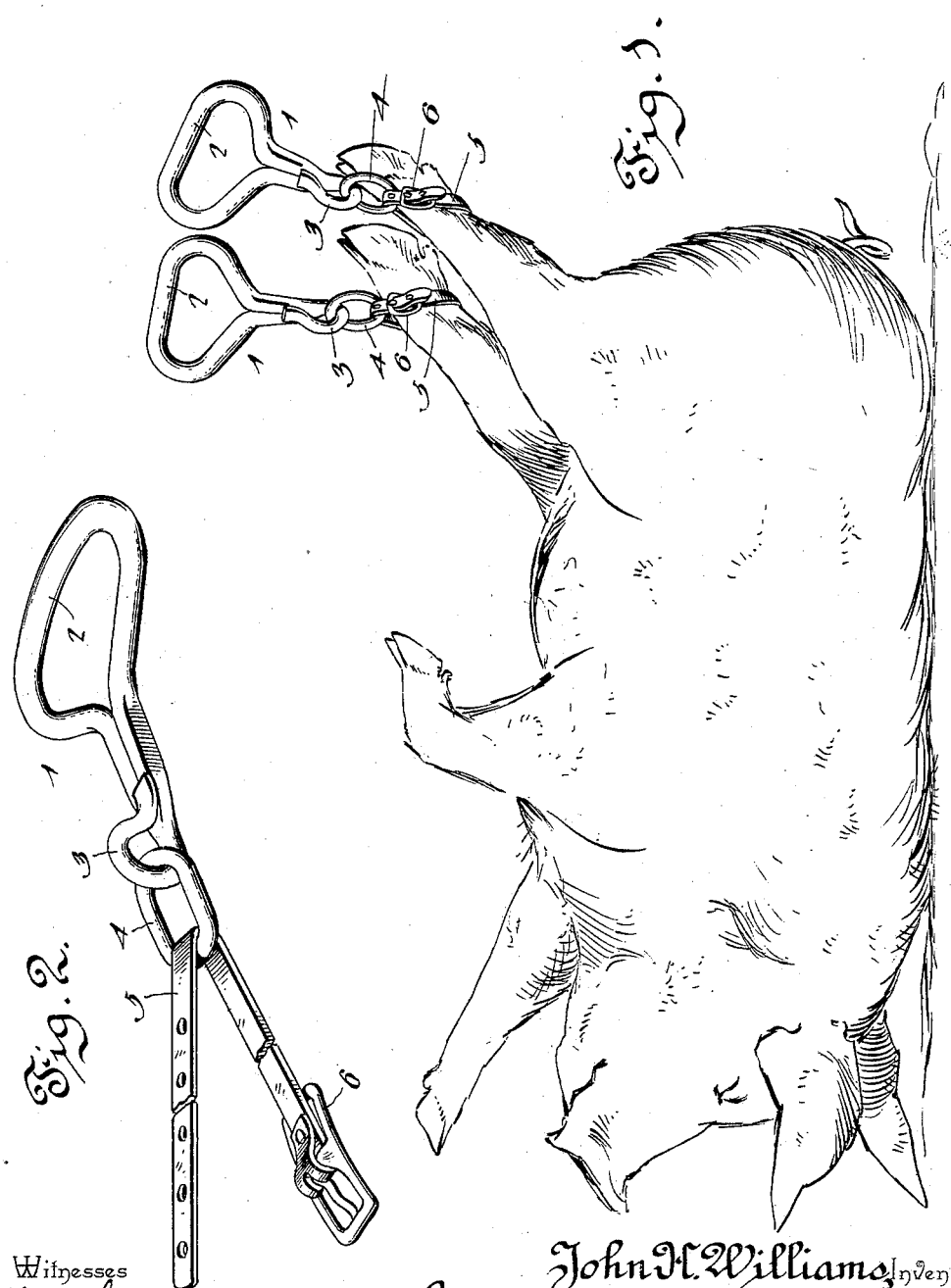
Witnesses  
J. Frank Culverwell  
N. J. Riley
John H. Williams, Inventor.  
By his Attorneys,  
C. A. Snow & Co.

UNITED STATES PATENT OFFICE.

JOHN H. WILLIAMS, OF SPRING HILL, KENTUCKY.

DEVICE FOR HANDLING HOGS.

SPECIFICATION forming part of Letters Patent No. 652,307, dated June 26, 1900.

Application filed March 17, 1899. Serial No. 709,530. (No model.)

*To all whom it may concern:*

Be it known that I, JOHN H. WILLIAMS, a citizen of the United States, residing at Spring Hill, in the county of Hickman and State of Kentucky, have invented a new and useful Device for Handling Hogs, of which the following is a specification.

The invention relates to improvements in devices for handling hogs.

The object of the present invention is to provide a simple, inexpensive, and efficient device designed for facilitating the handling of hogs when the animals are slaughtered on farms and similar places and capable of being readily applied to the legs of a hog to enable the same to be dragged from the point where it is killed to the place of scalding and to be handled easily in the scalding and subsequent operations.

The invention consists in the construction and novel combination and arrangement of parts hereinafter fully described, illustrated in the accompanying drawings, and pointed out in the claim hereto appended.

In the drawings, Figure 1 is a perspective view of a hog, showing devices constructed in accordance with this invention applied to the same. Fig. 2 is an enlarged view of the device detached.

Like numerals of reference designate corresponding parts in both figures of the drawings.

1 designates a handle consisting of a loop 2 and a shank formed integral with the loop and provided with an eye 3, located at its end and rigidly connected with the loop and receiving a link 4. The loop 2 of the handle is substantially triangular, its transverse portion forming a convenient grip and adapted to be readily grasped by the operator. The link 4, which is arranged in the eye 3 at the extremity of the shank, receives a short strap 5 and forms a flexible connection between the same and the handle, which may be arranged in any position relative to the strap. The strap 5, which is short, as clearly illustrated in Fig. 2 of the accompanying drawings, is provided at one end with a buckle 6 and at its other end with perforations, and it is adapted to encircle a leg of a hog to connect the handle thereto, as clearly shown in Fig. 1.

A pair of the devices is applied to the rear legs of a hog, as shown in Fig. 1, after the animal has been killed, to enable it to be dragged from the point where it is killed to the place of scalding, and after the fore part of the hog has been scalded the devices may be transferred to the fore legs of the animal to enable the rear portion to be similarly treated, the devices serving as convenient means for enabling the hog to be readily handled. The device also enables the hog to be readily handled when weighing or otherwise operating on it, and in splaying young hogs the device may be conveniently employed for suspending the animal from any suitable support.

In order to support the animal in an elevated position, a couple of spikes may be driven into the wall of a stable or barn, and when an animal is suspended in this manner there is no liability of its accidentally slipping.

The invention has the following advantages: The device, which is simple and comparatively inexpensive in construction, is adapted to be quickly applied to the leg of a hog and may be readily transferred from one leg to another. After it is applied there is no danger of it accidentally slipping, and it furnishes a convenient means for dragging or carrying an animal and for handling it while scalding or otherwise operating on the same.

Changes in the form, proportion, size, and the minor details of construction within the scope of the appended claim may be resorted to without departing from the spirit or sacrificing any of the advantages of this invention.

What is claimed is—

A device for carrying hogs by hand comprising a handle consisting of a straight shank, an enlarged loop rigid with the outer end of the shank and forming a grip, and an inner eye rigid with the inner end of the shaft and disposed in a plane substantially at right angles to the plane of the outer loop, a strap having a buckle and adapted to be fastened around the leg of an animal, and a link having the strap passed through it and linked into the said eye and forming a flexible connection between the handle and the strap, substantially as described.

In testimony that I claim the foregoing as my own I have hereto affixed my signature in the presence of two witnesses.

JOHN H. WILLIAMS.

Witnesses:
  J. D. HAYS,
  THOS. D. SAMUELS.